United States Patent
Rao et al.

(10) Patent No.: US 10,140,516 B2
(45) Date of Patent: Nov. 27, 2018

(54) EVENT-BASED IMAGE MANAGEMENT USING CLUSTERING

(71) Applicant: Samsung Electronics Co., Ltd., Gyeonggi-Do (KR)

(72) Inventors: Jinghai Rao, Santa Clara, CA (US); Wu Guan, San Jose, CA (US); Syyean Gastelum, Santa Clara, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 78 days.

(21) Appl. No.: 14/971,451

(22) Filed: Dec. 16, 2015

(65) Prior Publication Data

US 2017/0177942 A1   Jun. 22, 2017

(51) Int. Cl.
| G06K 9/62 | (2006.01) |
| G06K 9/46 | (2006.01) |
| G06K 9/54 | (2006.01) |
| G06F 7/00 | (2006.01) |
| G06K 9/00 | (2006.01) |

(52) U.S. Cl.
CPC ....... *G06K 9/00718* (2013.01); *G06K 9/6218* (2013.01); *G06K 2009/00738* (2013.01)

(58) Field of Classification Search
CPC ............. G06K 9/00718; G06K 9/6218; G06K 2009/00738
USPC ........................................ 382/225, 190, 305
See application file for complete search history.

(56) References Cited

U.S. PATENT DOCUMENTS

| 7,009,643 | B2 | 3/2006 | Nakamura et al. |
| 7,870,137 | B2 | 1/2011 | Ohwa |
| 8,479,107 | B2 | 7/2013 | Vainio et al. |
| 8,704,913 | B2 | 4/2014 | Kita |
| 8,856,121 | B1 | 10/2014 | Makki et al. |
| 8,918,463 | B2 | 12/2014 | Garcia et al. |
| 2008/0270880 | A1 | 10/2008 | Becker |
| 2008/0320107 | A1 | 12/2008 | Park |
| 2010/0082624 | A1* | 4/2010 | Martin .............. G06F 17/30041 707/737 |
| 2011/0115943 | A1* | 5/2011 | Sassa ................ G06F 17/30247 348/231.5 |

(Continued)

FOREIGN PATENT DOCUMENTS

EP   2007124 B1   9/2012

OTHER PUBLICATIONS

WIPO Appln. PCT/KR2016/005909, International Search Report and Written Opinion, dated Aug. 24, 2016, 11 pg.

(Continued)

*Primary Examiner* — Kathleen Y Dulaney

(74) *Attorney, Agent, or Firm* — Cuenot, Forsythe & Kim, LLC

(57) ABSTRACT

Managing a plurality of images may include generating, using a processor, clusters of images from a plurality of images having locations and timestamps. The clusters may represent events and may be generated according to a distance metric based upon geographic distance and time difference between consecutive pairs of the plurality of images sorted according to time. Selected clusters may be merged, using the processor, into a merged cluster representing a trip based upon geographic distance between the clusters and unique dates within the clusters. The plurality of images may be displayed, using the processor, organized according to the trip.

14 Claims, 6 Drawing Sheets

(56) References Cited

U.S. PATENT DOCUMENTS

| | | |
|---|---|---|
| 2011/0205399 A1 | 8/2011 | Gao et al. |
| 2012/0059843 A1 | 3/2012 | O'Donnell |
| 2012/0096361 A1 | 4/2012 | Osten |
| 2012/0141023 A1 | 6/2012 | Wang et al. |
| 2012/0177292 A1 | 7/2012 | Cheon et al. |
| 2012/0301039 A1 | 11/2012 | Maunder et al. |
| 2014/0046914 A1 | 2/2014 | Das et al. |
| 2014/0181089 A1 | 6/2014 | Desmond et al. |
| 2014/0321762 A1* | 10/2014 | Pozas Trevino ....... G11B 27/28 382/225 |

OTHER PUBLICATIONS

Ankerst, M. et al., "OPTICS: Ordering Points to Identify the Clustering Structure," In Proc. of ACM SIGMOD'99 Int'l. Conf. on Management of Data, Jun. 1, 1999, vol. 28, No. 2, pp. 49-60.

* cited by examiner

805

Feb 16   Tunnington Dr, Carnelian Bay
| 1 |

Feb 15         Street A, Olympic Valley
| 2 | 3 | 4 | 5 | 6 | 7 |
| 8 | 9 | 10 | 11 | 12 | 13 |

Feb 14         Street B, Olympic Valley
| 14 | 15 | 16 | 17 | 18 | 19 |

Feb 8          Street D, City Y
| 20 | 21 | 22 | 23 |

810

Feb 14-16                Olympic Valley
| 1 | 2 | 3 | 4 | 5 | 6 |
| 7 | 8 | 9 | 10 | 11 | 12 |
| 13 | 14 | 15 | 16 | 17 | 18 |
| 19 |

Feb 8          Street D, City Y
| 20 | 21 | 22 | 23 |

FIG. 8

EVENT-BASED IMAGE MANAGEMENT USING CLUSTERING

TECHNICAL FIELD

This disclosure relates to image management and, more particularly, to determining events from images using clustering techniques and organizing the images in accordance with the determined events.

BACKGROUND

Portable devices equipped with cameras have become pervasive. This has led to a dramatic increase in the number of photos taken by users. During events such as social occasions, vacations, or the like, users tend to take even more photos than otherwise would be the case. These events have durations that may vary widely. Some events, for example, may last only several hours, while other events may last several days. Further, events may be spaced apart in time and/or distance.

Many image management systems attempt to organize images, including photos, according to time. For example, images from a same day or a same month are often grouped together for viewing. In other cases, the image management system may rely upon geographic location of images. For example, images from a same geographic location may be grouped together for viewing.

SUMMARY

One embodiment may include a method of managing a plurality of images. The method may include generating, using a processor, clusters of images from a plurality of images having locations and timestamps. The clusters may represent events and may be generated according to a distance metric based upon geographic distance and time difference between consecutive pairs of the plurality of images, where the plurality of images may be sorted according to time. The method may include merging, using the processor, selected clusters into a merged cluster representing a trip based upon geographic distance between the clusters and unique dates within the clusters. The method may include displaying, using the processor, the plurality of images organized according to the trip.

Another embodiment may include a system for managing images. The system may include a processor programmed to initiate executable operations. The executable operations may include generating clusters of images from a plurality of images having locations and timestamps. The clusters may represent events and may be generated according to a distance metric based upon geographic distance and time difference between consecutive pairs of the plurality of images, where the plurality of images may be sorted according to time. The executable operations may include merging selected clusters into a merged cluster representing a trip based upon geographic distance between the clusters and unique dates within the clusters. The executable operations may also include displaying the plurality of images organized according to the trip.

Another embodiment may include a computer program product. The computer program product may include a computer readable storage medium having program code stored thereon. The program code is executable by a processor to perform a method of managing images. The method may include generating, using the processor, clusters of images from a plurality of images having locations and timestamps. The clusters may represent events and may be generated according to a distance metric based upon geographic distance and time difference between consecutive pairs of the plurality of images, where the plurality of images may be sorted according to time. The method may include merging, using the processor, selected clusters into a merged cluster representing a trip based upon geographic distance between the clusters and unique dates within the clusters. The method further may include displaying, using the processor, the plurality of images organized according to the trip.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIG. 8 is a block diagram illustrating exemplary views of a screen of a mobile computing device.

DETAILED DESCRIPTION

Figure 1:
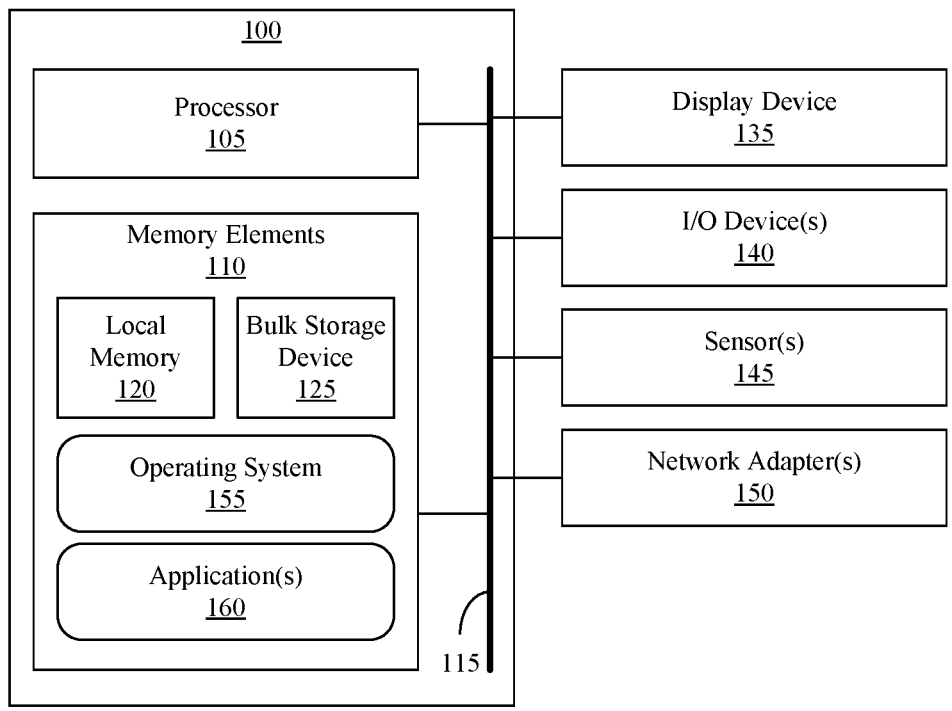
FIG. 1 is a block diagram illustrating an exemplary data processing system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to image management and, more particularly, to determining events from images using clustering techniques and organizing the images in accordance with the determined events. In accordance with the inventive arrangements disclosed herein, a collection of images may be processed to determine events based upon timestamps and locations of the images. A clustering technique may be applied to generate clusters of images from the collection. The clusters may represent events. The resulting clusters may be further processed to determine trips from selected ones of the clusters. Trips may be generated from groupings of two or more clusters based upon a variety of factors that may include, but are not limited to, number of unique days within clusters, geographic distance between clusters, and/or time difference between clusters.

In another aspect, one or more images without locations may also be processed. In one arrangement, one or more images without locations may be included within an existing trip based upon the timestamp(s) of the image(s). In another arrangement, one or more additional trips may be generated from images without locations. The additional trips may be created relative to other trips already determined using the clustering techniques described herein for images with both timestamps and locations.

The inventive arrangements described within this disclosure may be performed by a data processing system. The data processing system may store a collection of images that may be organized into trips as described. The data processing system may display the images organized in the trips. Unlike other conventional approaches for image management, the trips that are determined may span multiple days and/or multiple locations. Images for extended trips may be kept together despite the trips taking place over multiple days or at multiple geographic locations. In other cases, multiple trips may be detected within the timespan of a single day.

The inventive arrangements described within this disclosure utilize low levels of computational resources. Further, the various embodiments described herein may be performed locally within a data processing system, e.g., a mobile computing device, without the aid and/or uploading of images to a server for processing. Moreover, access to network-based services is not required in order to detect trips from images as described.

FIG. 1 is a block diagram of an exemplary data processing system (system) 100. System 100 may be used to implement any of a variety of systems and/or devices that include a processor and memory and that are capable of performing the operations described within this disclosure.

As pictured, system 100 includes at least one processor 105 coupled to memory elements 110 through a system bus 115 or other suitable circuitry such as an input/output (I/O) subsystem. System 100 stores program code within memory elements 110. Processor 105 executes the program code accessed from memory elements 110 via system bus 115. Memory elements 110 include one or more physical memory devices such as, for example, a local memory 120 and one or more bulk storage devices 125. Local memory 120 refers to random access memory (RAM) or other non-persistent memory device(s) generally used during actual execution of the program code. Bulk storage device 125 may be implemented as a hard disk drive (HDD), solid state drive (SSD), or other persistent data storage device. System 100 may also include one or more cache memories (not shown) that provide temporary storage of at least some program code in order to reduce the number of times program code must be retrieved from bulk storage device 125 during execution.

System 100 may be coupled to one or more I/O devices such as display device 135 and/or one or more additional I/O device(s) 140. System 100 may be coupled to one or more sensor(s) 145. System 100 further may be coupled to one or more network adapter(s) 150. The I/O devices described herein, sensor(s) 145, and/or network adapter(s) 150 may be coupled to system 100 either directly or through intervening I/O controllers.

In one aspect, display device 135 may be implemented as a display or screen that is not touch sensitive. In another aspect, display device 135 may be implemented as a display or screen that is touch sensitive. Examples of I/O device(s) 140 may include, but are not limited to, a keyboard, a pointing device, a camera, a speaker, and a microphone. In some cases, one or more of the I/O device(s) may be combined as in the case where a touch sensitive screen is used as display device 135. In that case, display device 135 may also implement a keyboard and a pointing device. Exemplary sensor(s) 145 may include, but are not limited to, an accelerometer, a light sensor, touch screen sensors, one or more biometric sensors, a gyroscope, a compass, or the like.

Network adapter(s) 150 may be implemented as communication circuits configured to establish wired and/or wireless communication links with other devices. The communication links may be established over a network or as peer-to-peer communication links. Accordingly, network adapter(s) 150 enable system 100 to become coupled to other systems, computer systems, remote printers, and/or remote storage devices. Exemplary network adapter(s) 150 may include, but are not limited to, modems, cable modems, Ethernet cards, wireless transceivers, whether short and/or long range wireless transceivers (e.g., cellular transceivers, 802.11x (Wi-Fi™) compatible transceivers, Bluetooth® compatible transceivers, and the like).

As pictured in FIG. 1, memory elements 110 may store an operating system 155 and one or more application(s) 160. In one aspect, operating system 155 and application(s) 160, being implemented in the form of executable program code, are executed by system 100 and, more particularly, by processor 105. As such, operating system 155 and application(s) 160 may be considered an integrated part of system 100. Operating system 155, application(s) 160, and any data items used, generated, and/or operated upon by system 100 are functional data structures that impart functionality when employed as part of system 100.

In one aspect, system 100 may be used to implement a computer such as a personal computer, a server, or the like. In another aspect, system 100 may be used to implement a mobile computing device. Examples of mobile computing devices may include, but are not limited to, a "smart" phone, a tablet computer, a mobile media device, and a game console, a mobile Internet device (MID), a personal digital assistant, a laptop computer, a mobile appliance device, or the like.

System 100 may include fewer components than shown or additional components not illustrated in FIG. 1 depending upon the particular type of device that is implemented. In addition, the particular operating system and/or application(s) included may also vary according to device type as may the types of network adapter(s) included. Further, one or more of the illustrative components may be incorporated into, or otherwise form a portion of, another component. For example, a processor may include at least some memory.

Figure 2:
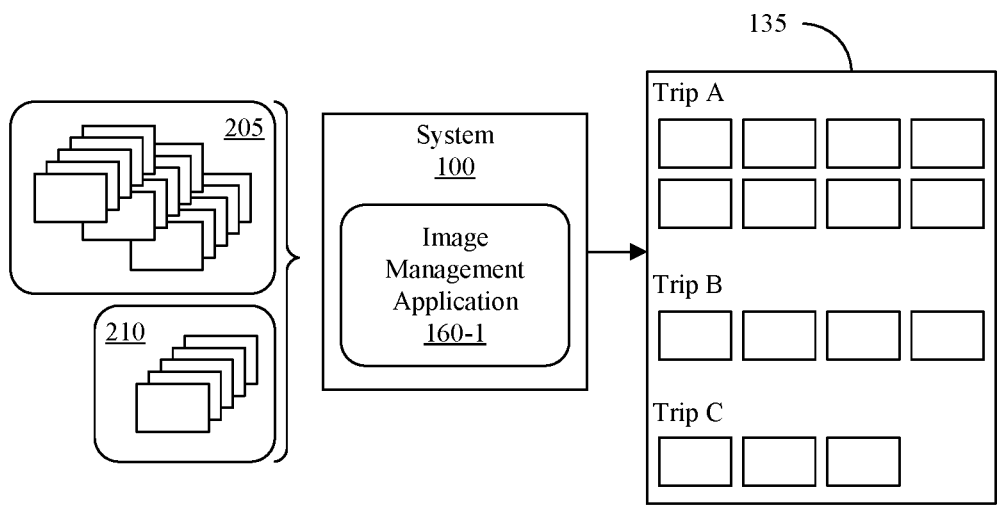
FIG. 2 is a block diagram illustrating an example of image management using a data processing system.

FIG. 2 is a block diagram illustrating an example of image management using system 100 of FIG. 1. For purposes of clarity and ease of discussion, some elements of system 100 are not shown. For example, the memory elements, the operating system, various sensors, I/O devices, and/or network adapters are not shown.

System 100 may store a collection 205 of images within memory elements (not shown). Collection 205 represents a plurality of images. An image may be any digital representation, e.g., file, of something. Exemplary images may include, but are not limited to, screen shots, a slide, or the like. Another example of an image is a photo. As defined herein, a "photo" is an image that is captured or generated by a camera.

As known, images may include metadata. The metadata for an image may include a timestamp indicating when the image was generated. In some cases, metadata for an image may also include a location indicating where the image was generated. One exemplary type of metadata is "Exchangeable Image File Format" or "Exif". It should be appreciated that data such as time expressed using a timestamp and/or geographic data expressed as a location may be stored as metadata as part of an image (e.g., as part of the image file) or separately from the image file, but in association with the image file using any of a variety of different data structures and/or file formats. The inventive arrangements described within this disclosure are not intended to be limited by the particular manner in which metadata, e.g., timestamps and/or locations, are stored for images.

As defined within this disclosure, the term "timestamp" means a date or a date and a time that an image is generated or created. A timestamp may be generated using a system clock or other timing reference of system 100 (not shown). As defined within this disclosure, the term "location," as used in reference to an image, means a geographic location where the image is generated or created. In one arrangement, a location may be specified as Global Positioning System (GPS) coordinates. For example, a location of an image may be expressed using latitude and longitude coordinates. It should be appreciated, however, that the inventive arrangements described herein are not intended to be limited by the particular manner in which locations are determined for images. In some cases, locations may be determined using GPS. In other cases, locations may be determined using triangulation techniques, using identifiable wireless network access points, using trajectory information, or the like.

For purposes of discussion, each image of collection 205 may have a timestamp and a location. In the example of FIG. 2, system 100 may execute an image management application 160-1 to process images of collection 205. System 100, in executing image management application 160-1, may perform operations such as generating clusters of images from collection 205. Each cluster may represent an event and may include one or more images. The clusters may be generated according to a distance metric calculated for consecutive pairs of images. System 100 may merge selected clusters into one or more merged clusters. Each of the merged clusters may represent a trip. As defined herein, the term "trip" means a merged cluster formed of two or more clusters where each cluster represents an event. System 100 may perform merging according to distance between the clusters, unique dates within the clusters, and/or time difference between the clusters. System 100 may display collection 205 organized according to the trip(s) A, B, and C on display device 135.

In another arrangement, system 100 may receive and/or store an additional collection 210 of one or more images that have timestamps and do not have locations. System 100 may organize the images of collection 210 into existing trips or may generate new trips that include selected images from collection 210. System 100 may display images of collection 210 on display device 135 as part of one or more of trips A, B, and/or C and/or within additional trips that may be generated and displayed as described herein.

Figure 3:
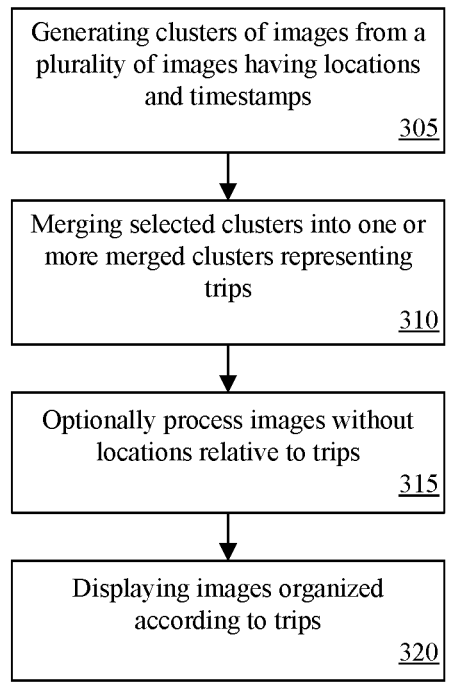
FIG. 3 is a flow chart illustrating an exemplary method of image management using a data processing system.

FIG. 3 is a flow chart illustrating an exemplary method 300 of image management using a data processing system. Method 300 may be performed by a system such as system 100 as described with reference to FIGS. 1 and 2. Method 300 may begin in a state where the system stores a plurality of images, e.g., a collection of images. Some images may have both timestamps and locations. Other images may have only timestamps and no locations.

In block 305, the system may generate clusters of images from the plurality of images (e.g., the collection) that have both timestamps and locations. Images with no location may be processed separately. As noted, a cluster may represent an event. Examples of events may be social occasions or activities. In block 310, the system may merge selected clusters, e.g., events, to form one or more merged clusters. Each merged cluster may represent a trip. Each trip includes two or more events. In block 315, the system may optionally process images without locations. The images without locations, if stored in the system, may be processed relative to the trips determined in block 310. In block 320, the system may display the images organized according to the merged clusters or trips.

Figure 4:
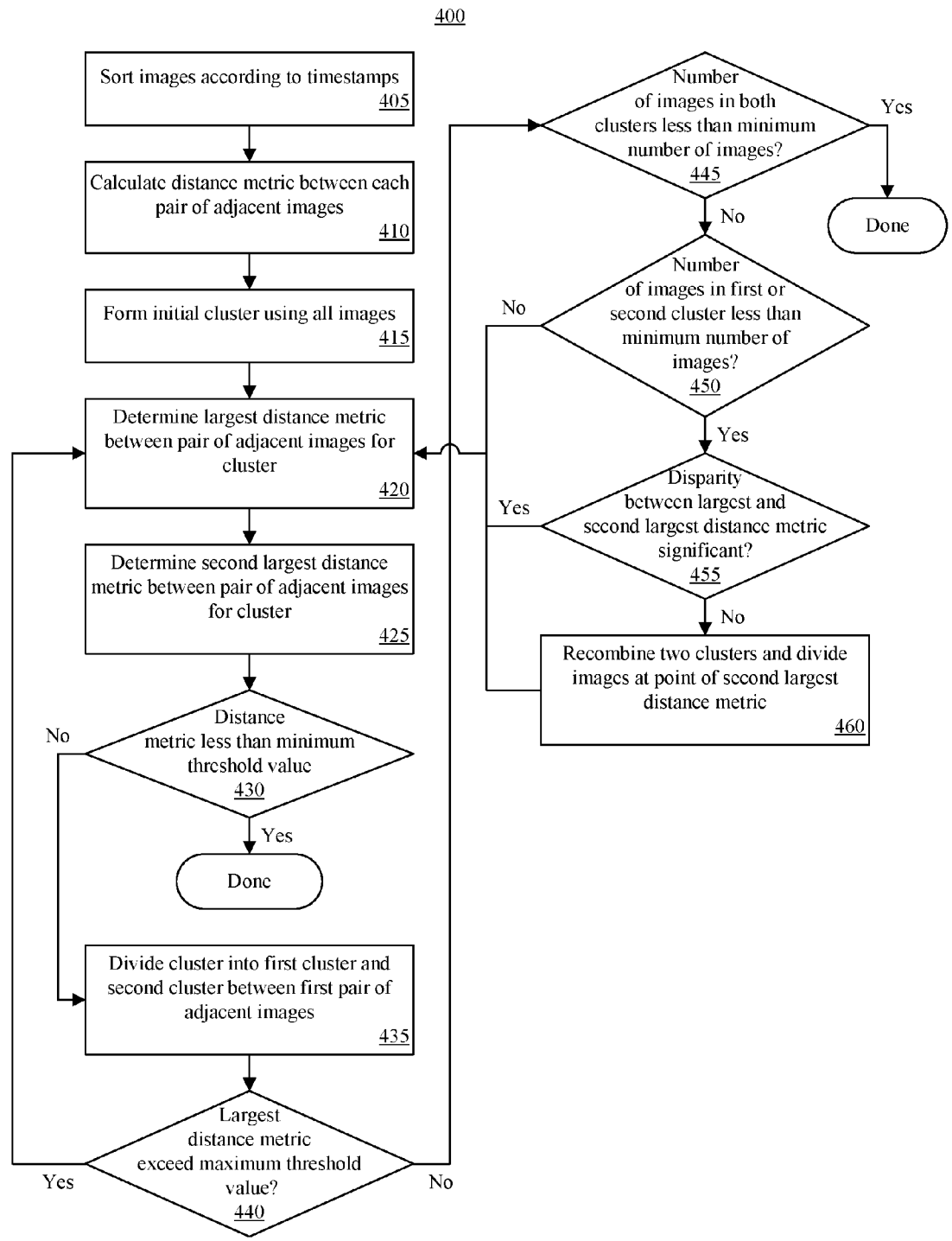
FIG. 4 is a flow chart illustrating another exemplary method of image management using a data processing system.

FIG. 4 is a flow chart illustrating another exemplary method 400 of image management using a data processing system. More particularly, FIG. 4 illustrates an exemplary implementation of the clustering performed in block 305 of FIG. 3. Accordingly, FIG. 4 may be performed by system 100 of FIGS. 1 and 2. Method 400 may begin in a state where the system has stored a plurality of images, e.g., collection 205, where each image of the collection has a timestamp and a location. The process illustrated in FIG. 4 may be performed recursively to continually subdivide the collection to form clusters until a stopping condition is met.

In block 405, the system may sort the images of the collection according to timestamps. In block 405, the system may sort the images in date and time order. The system may sort the images in ascending chronological order or in descending chronological order.

In block 410, the system may calculate a distance metric between each pair of adjacent images of the collection. Adjacent images, subsequent to block 405, are adjacent in time, whether sorted in ascending chronological order or descending chronological order. In one arrangement, the distance metric may be calculated as a function of time using timestamps of the images and as a function of geographical distance using locations of the images. As an example, the distance metric, as determined for two adjacent images, may be calculated using Expression 1 below.

$$\text{Distance}(\text{image}_{i+1}, \text{image}_i) = a*(\text{image}_{i+1}\text{time} - \text{image}_i\text{time}) + \text{geographical.distance}(\text{image}_i\text{location}, \text{image}_{i+1}\text{location}) \quad (1)$$

Within Expression 1, the term "a" is a coefficient that may be used to weight the difference in time between $\text{image}_{i+1}$ and $\text{image}_i$. For example, the term a may be set to a value between 0 and 1. The terms $\text{image}_i\text{time}$ and $\text{image}_{i+1}\text{time}$ mean the date and time of $\text{image}_i$ and of $\text{image}_{i+1}$, respectively, as specified by the timestamp of each image. The terms $\text{image}_i\text{location}$ and $\text{image}_{i+1}\text{location}$ mean the locations of $\text{image}_i$ and of $\text{image}_{i+1}$, respectively.

In block 415, the system may form a cluster, e.g., an initial cluster, that includes all of the images in the collection to be processed. The cluster formed in block 415 may be continually subdivided into further clusters until a stopping criterion is met. In block 420, the system may determine the largest distance metric denoted herein as "d" between a pair of adjacent images in the cluster. For ease of discussion, the terms "first" and "second" are used only to distinguish one element, e.g., a pair of adjacent images in this case, from another element. Accordingly, the pair of adjacent images having the largest distance metric d of all adjacent pairs of images in the cluster may be referred to as the "first" pair of adjacent images. In block 425, the system may determine the second largest distance metric denoted herein as "d1" between a pair of adjacent images. Accordingly, the pair of images having the second largest distance metric d1 of all adjacent pairs of images in the cluster may be referred to as the second pair of adjacent images.

In block 430, the system may determine whether the selected distance metric, i.e., the largest distance metric d, is less than a predetermined minimum threshold value referred to herein as "MIN_VALUE". The term MIN_VALUE may represent a minimum threshold value for evaluating the distance metric between images in a cluster. If the largest distance metric d is less than the minimum threshold value, the system determines that there are no events and terminates the clustering process. Accordingly, if the largest distance metric d is less than MIN_VALUE, method 400 may end. If not, method 400 may continue to block 435.

Continuing with block 435, the system may divide the cluster into a first cluster and a second cluster at the point located between the two images of the first pair of adjacent images. The point where the system divides the cluster may be denoted herein as l. For example, for an $image_i$ and an $image_{i+1}$ that form the first pair of adjacent images having the distance metric of d, the point between the two images may be referred to as l and is the dividing point to form the first and second cluster from the initial cluster.

In block 440, the system may determine whether the largest distance metric d exceeds a maximum threshold value denoted herein as "MAX_VALUE". The term MAX_VALUE may represent a maximum threshold or maximum distance metric for images to be part of a same cluster regardless of the resulting cluster size. A largest distance metric that exceeds MAX_VALUE will cause the system to loop back to recursively subdivide the cluster into smaller clusters. If the largest distance metric d exceeds MAX_VALUE, method 400 may loop back to block 420 to continue processing. In that case, for example, the system may subdivide the first cluster and the second cluster into further clusters and iterate. The system may perform the clustering recursively as described until the distance metric that is used to subdivide clusters into further clusters meets the stopping condition specified in block 430. If the largest distance metric d does not exceed the maximum threshold value, method 400 may continue to block 445.

Continuing with block 445, the system may determine whether the number of images in the first cluster is less than a minimum number of images denoted herein as "MIN_NUMBER" and whether the number of images in the second cluster is also less than MIN_NUMBER. The system may determine that when the number of images in both the first cluster and the second cluster are both less than the minimum number of images MIN_NUMBER, the clustering process may stop. Accordingly, when the stopping condition of block 445 is met, method 400 may end. If not, method 400 may continue to block 450 to continue processing.

In block 450, the system may determine whether the number of images in the first cluster or the number of images in the second cluster is less than the minimum number of images MIN_NUMBER. If so, method 400 may continue to block 455. If not, method 400 may loop back to block 420 to continue processing by dividing clusters into additional clusters until the stopping condition of block 430 or the stopping condition of block 445 is met. In block 455, the system may determine whether the disparity between the largest distance metric and the second largest distance metric is significant. In one example, the system may determine that a significant disparity exists when a ratio of the largest distance metric d to the second largest distance metric d1 exceeds a threshold value denoted as "T". If the system determines that a disparity between the largest and second largest distance metrics is significant, method 400 may loop back to block 420. If not, the method 400 may continue to block 460.

In the case where the system determines that a disparity exists and method 400 loops back to block 420, the system may maintain the first and second clusters as defined by the location l. Method 400 may continue by recursively subdividing the clusters until a stopping condition is met. In the case where the system determines that no disparity exists, method 400 may continue to block 460. In block 460, the system may recombine the first and second clusters and divide the images at point l1 of the second largest distance metric d1.

In performing blocks 450, 455, and 460, the system may prevent situations where the number of images in the first cluster and the second cluster is skewed. In illustration, consider an example where the largest distance metric between the sorted images results in a first cluster of 99 images and a second cluster of 1 image. If the system determines that d/d1>T, the system may choose to recombine the first cluster and the second cluster and divide the images according to the second largest distance metric d1 at point l1. The resulting first and second clusters using l1 as the point of division may result in more evenly balanced clusters, e.g., a first cluster of 49 images and a second cluster of 51 images. In cases where the number of images in the first cluster is significantly higher than the number of images in the second cluster, 99 to 1, the clustering is maintained when the ratio d/d1 exceeds the threshold T.

The terms MIN_VALUE, MAX_VALUE, MIN_NUMBER, and T may be adjusted based upon the type of geographic region in which a user resides. Different countries and/or cultures may have different standard geographic distances and/or time spans for travel throughout a user's day, week, or month. The geographic home region, for example, may dictate distances (e.g., in time and geographic distance) relating to a user's commute for work, recreation, and the like. As an illustrative example, when traveling a quarter mile, a user in America may still be located in the user's neighborhood. In another country, however, traveling a quarter mile may place the user well outside of the user's neighborhood.

The image management techniques described within this disclosure address these geographic and/or cultural differences by accounting not only for minimum and/or maximum geographical distance, but also for factors such as time difference, minimum number of photos in a cluster, and the like, which may influence cluster formation. Also, values for a in Expression 1, MIN_VALUE, MAX_VALUE, and T, for example, may be adjusted based upon factors including, but not limited to, geographic location of the user, whether the user lives in a densely populated urban environment, whether the user lives in a more sparsely populated suburban or rural environment, or the like, to achieve increased accuracy with respect to event and/or trip detection during image processing.

In another arrangement, block 305 of FIG. 3 may be illustrated using pseudocode shown below as Example 1.

Example 1

Sort the photos according to timestamps.
Calculate distance metrics for every pair of adjacent photos sorted according to timestamp.
Recursively perform the following:
1. Find the largest distance metric d at position l.
2. If d<MIN_VALUE, stop clustering.
3. Divide photos at l into first cluster and second cluster.
4. If d>MAX_VALUE, repeat step 1 for both first cluster and second cluster.
5. If both first and second clusters have fewer than MIN_NUMBER images, stop clustering.
6. If both first cluster and second cluster have more than MIN_NUMBER images, repeat step 1 for first cluster and second cluster.
7. If either first cluster or second cluster has fewer than MIN_NUMBER images, find the second largest distance metric d1 at position l1.
8. If d/d1>T, divide at l and repeat step 1 for both first cluster and second cluster.
9. Otherwise, divide at l1 and repeat step 1 for first cluster and second cluster.

Figure 5:
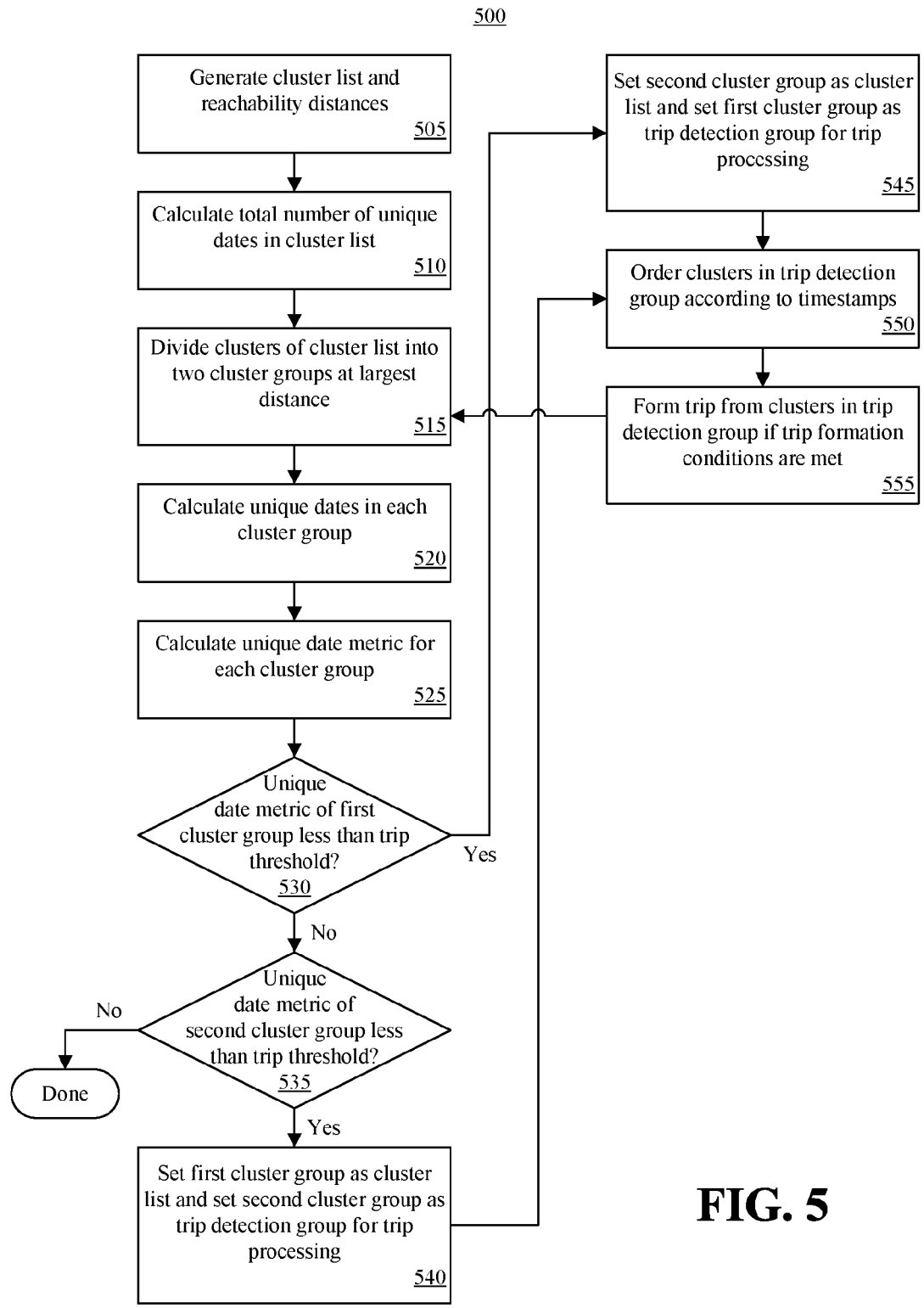
FIG. 5 is a flow chart illustrating another exemplary method of image management using a data processing system.

FIG. 5 is a flow chart illustrating another exemplary method 500 of image management using a data processing system. More particularly, FIG. 5 illustrates an exemplary implementation of the merging performed in block 310 of FIG. 3 to determine trips from events (i.e., clusters). Accordingly, method 500 may be performed by system 100 of FIGS. 1 and 2. Method 500 may begin in a state where the system has determined a plurality of clusters as described with reference to FIG. 4. The clusters include images that have both timestamps and locations.

In block 505, the system may generate a cluster list and reachability distances from the initial group of clusters determined in block 305. In one exemplary implementation, the system may determine locations for the clusters. In one example, for each cluster, the system may calculate the average latitude and the average longitude of the locations of the images in the cluster. The resulting average latitude and the resulting average longitude may be used as the location of the cluster, or the "cluster location."

The system may calculate the geographic distance denoted as "$d_g$" between each possible pair of clusters in the cluster group. The system may use the cluster locations of the clusters in calculating the geographic distances. In one aspect, the system may generate the cluster list by selecting a cluster from the group of clusters at random. The system may find the cluster that is closest to the selected cluster, as measured in geographic distance to the selected cluster. The system may add the cluster that is closest to the selected cluster to the cluster list. When a cluster is added to the cluster list, the reachability distance for the cluster is also added to the cluster list in association with the newly added cluster. Further, the cluster is removed from the group of clusters determined in block 305 being processed upon admission to the cluster list. The system may continue adding the next closest cluster (as measured in geographic distance to the selected cluster) to the cluster list in order until the group of clusters is empty.

Example 2 shows an exemplary pseudo code implementation of block 505. In Example 2, L represents the initial group of clusters determined in block 305; R represents the cluster list being generated; and D is the reachability distance, e.g., the geographic distance between two clusters.

Example 2

R.add(L[0]); L.remove(L[0]); D.add(0);
While L is not empty:
C=a cluster in L that has the smallest distance with any cluster in R;
R.add(C); D.add(smallest_distance(C, R)); L.remove(C)

In block 510, the system may calculate the total number of unique days represented in the cluster list. The system may evaluate the timestamps of the images belonging to the clusters of the cluster list to determine the total number of unique dates represented by the timestamps.

In block 515, the system may divide the clusters of the cluster list into two different cluster groups according to the largest geographic distance $d_g$. In block 520, the system may calculate the total number of unique dates in each of the cluster groups. In block 525, the system may calculate a unique date metric for each cluster group. In one arrangement, the unique date metric may be the ratio of the number of unique dates in a cluster group compared to the number of unique dates in the cluster list. The unique date metric may be compared to a trip threshold "P". In one aspect, P may be set to a value of 0.2. It should be appreciated that the particular value of P used herein is for purposes of illustration and, as such, is not intended as a limitation of the inventive arrangements.

In block 530, the system may determine whether the unique date metric of the first cluster group is less than the trip threshold P. If so, method 500 may continue to block 545. If not, method 500 may proceed to block 535. In block 545, the system may set the second cluster group as the cluster list and set the first cluster group as the trip detection group for trip processing. After block 545, method 500 may continue to block 550.

In block 535, the system may determine whether the unique date metric of the second cluster group is less than the trip threshold. If so, method 500 may continue to block 540. If not, method 500 may end. In block 540, the system may set the first cluster group as the cluster list and select the second cluster group as the trip detection group for trip processing.

In block 550, the system may order the clusters in the trip detection group according to timestamps. For example, the start date and time of the trip detection group may be calculated as the timestamp of the earliest image in the trip detection group. The end date and time may be the timestamp of the latest image of the trip detection group.

In block 555, the system may form an event from the clusters in the trip detection group if the trip formation conditions are met. In one aspect, the trip formation conditions may include determining that the two clusters are adjacent to one another, e.g., within a predetermined geographic distance of one another or ordered in increasing distances as added to the cluster list, and have a time difference that is less than a maximum time value denoted as "MAX_VALUE". If both conditions are met, then the two clusters (i.e., events) may be combined into an trip. The system may recursively evaluate further clusters of the trip detection group to add clusters to the trip.

Example 3 shows an exemplary pseudo code implementation of method 500 which excludes block 505. As noted with reference to Example 2, R represents the cluster list and D is the reachability distance. The exemplary pseudo code of Example 3 may be performed recursively.

Example 3

1. Find the biggest geographic distance $d_g$ in D and divide R into two cluster groups.
2. Calculate the total unique dates of R and of both cluster groups.
3. If (unique dates in a cluster group)/(unique dates of R)<P, detect events in the smaller cluster group and assign the larger cluster group as R and repeat step 1. Otherwise, stop.
4. In the smaller cluster group, order the clusters based on timestamp. Two clusters in the smaller cluster group belong to the same event if their indices in R are adjacent and their time distance is smaller than MAX_VALUE.

The event detection techniques described in FIG. 5 may discern between events using geographic distance. Consider an example where a user takes a trip to Europe, a trip to the East coast of the United States, a trip to Yosemite National Park, and a trip to Santa Cruz, but not necessarily in that order. The system would first separate the images from Europe as a first trip from the remainder of images. The system would then separate the images from the East Coast as a second trip from the remainder of images. The system would then separate the images from Yosemite National Park as a third trip from the remainder of the images. The system would then iterate and recognize the images from Santa Cruz as yet another trip.

Figure 6:
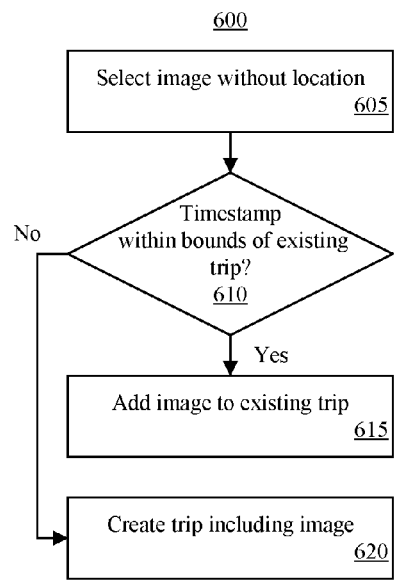
FIG. 6 is a flow chart illustrating an exemplary method of processing images without locations using a data processing system.

FIG. 6 is a flow chart illustrating an exemplary method 600 of processing images without locations using a data processing system. More particularly, FIG. 6 illustrates an exemplary implementation of processing images without locations described with reference to block 315 of FIG. 3. Method 600 may be performed by system 100 of FIGS. 1 and 2. Accordingly, method 600 may begin in a state where the system has received one or more images without location data. For example, the system may have captured one or more images with GPS location services turned off. It should be appreciated that the images without locations still have timestamps.

In block 605, the system may select an image without a location. In block 610, the system may determine whether the timestamp of the image falls within the bounds of a trip as determined in block 310. For example, the system may determine whether the timestamp of the selected image is after the timestamp of the earliest image of the trip and prior to the timestamp of the last image of the trip. The system may check the image against the trips to determine whether the image is within an existing trip. In one arrangement, the system may use Expression 1 where the distances are set to zero to determine time distance between the selected image and the trips.

If the timestamp of the selected image is within the bounds of a trip, method 600 may proceed to block 615. In block 615, the system may add the image to the trip. If the timestamp of the image is not within the bounds of a trip, method 600 may continue to block 620. In block 620, the system may create a trip including the selected image.

Figure 7:
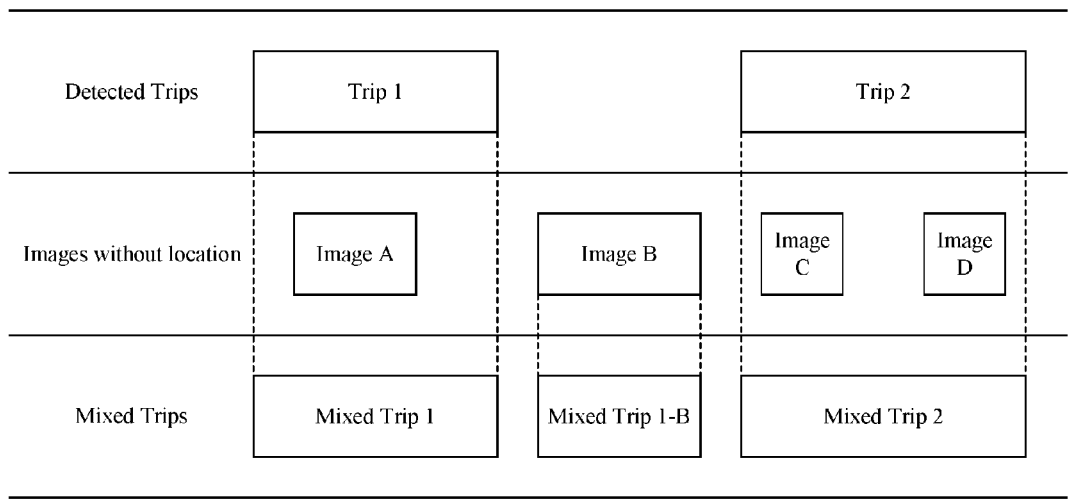
FIG. 7 is a block diagram illustrating exemplary processing of images without locations using a data processing system.

FIG. 7 is a block diagram illustrating exemplary processing of images without locations as performed by system 100 of FIGS. 1 and 2. In the example of FIG. 7, the system has created trip 1 and trip 2 upon completion of block 310 of FIG. 3. The system may receive additional images without locations such as images A, B, C, and D. In FIG. 7, time increases from left to right. Thus, the left edge of event 1 represents the image of trip 1 having the earliest timestamp, while the right edge of trip 1 represents the image of trip 1 having the latest timestamp. The images of trip 2 are similarly arranged and have timestamps after the images of trip 1.

In the case of image A, the system may determine that the timestamp of image A falls between the earliest image and the latest image of trip 1. In that case, the system may add image A to trip 1, thereby creating mixed trip 1. Mixed trip 1 includes the images processed through block 310 that include both timestamps and locations as well as image A.

In the case of image B, the system may determine that the timestamp of image B does not fall within either trip 1 or trip 2. In that case, the system may create a new trip called mixed trip 1-B. Mixed trip 1-B includes image B.

In the case of images C and D, the system may determine that the timestamps of images C and D fall between the earliest image and the latest image of trip 2. Accordingly, the system may add images C and D to trip 2, thereby creating mixed trip 2. Mixed trip 2 includes the images processed through block 310 that include both timestamps and locations as well as image C and image D.

In another arrangement, in the case where a plurality of images without locations have timestamps that fall between trips determined in block 310 or outside of a trip, the system may apply a time-based clustering technique. For example, the system may perform method 400, where the distances are set to zero, to determine one or more trips for the images without locations. The images may be displayed ordered in the determined time-based trips and displayed among trips determined in block 310, among mixed trips from block 315, and/or independently as trips that include only images without locations.

Having generated trips, the system may determine names for trips. Trips may be named using any of a variety of different naming techniques. In one arrangement, trips may be named according to one or more rules such as the rules illustrated below. In general, the location name used for a trip may be the name of a single place corresponding to an image in the trip or a name created using a plurality of places of images in the trip.

If a trip has one location, the system may use the "street name, city name" or the "landmark name, city name" as the name. A landmark may be a park, a shopping mall, or the like. In one arrangement, a landmark may be determined using a geolocation service as is generally known in the art. The system may access the geolocation service through a network connection using the application programming interface (API) of the service. For example, referring to the Google Maps Geolocation API, the landmark may be the "establishment" field of the API.

If a trip has more than one location within a same city, the system may use the "city name" as the name.

If a trip has locations from more than one city, but less than a predetermined number of cities "N", e.g., where N is 4 in this example, the system may use each of the city names in a list as the name. For example, the name may be "City Name 1 & City Name 2 & City Name 3".

If a trip has locations from more than "N" cities, the system may use the state in which the cities are located as the name. For example, the name may be "State Name".

If a trip has locations from more than one state, but less than "M" states, where M may be 4 in this example, the system may use the name of each state in a list as the name. For example, the name may be "State Name 1 & State Name 2 & State Name 3".

If a trip has locations from more than M states, the system may use the name of the country in which the states are located as the name. For example, the name may be "Country Name".

If a trip has more than one country, the system may use a list of the countries as the name. For example, the name may be "Country 1 & Country 2".

In another arrangement, the system may apply one or more additional rules when determining names of trip. In the case of mobile computing devices, the size of the display screen is often constrained thereby limiting the length of names that may be displayed and still be readable by users. Accordingly, the system may constrain names to be no more than a predetermined number of characters. In one example, names may be constrained to being 22 characters or less. The system may constrain the length of names by applying abbreviations where possible. For example, other than conventional abbreviations such as "Dr" for "Drive," the system may use additional abbreviations such as "NP" for "National Park". In other cases, when the name of an event exceeds the character limit, the system may move the naming convention to the next higher level. For example, when the list of N cities exceeds the character limit, the system may use the state name as the name of the trip. It should be appreciated that while the exemplary rules are described for naming trips, the rules may also be applied to naming events when applicable.

FIG. 8 is a block diagram illustrating exemplary views of a screen of a mobile computing device. View 805 illustrates a collection of images 1-23 prior to performing the clustering techniques described herein. As pictured, the images are organized according to date. In view 810, the system has determined that images 1-19 correspond to one single trip, despite the images being created over several days and at more than one location (e.g., Tunnington Drive in Carnelian Bay and at different streets in Olympic Valley). Accordingly, the system has displayed images 1-19 as part of a same trip.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing.

Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "program code," "software," "application," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/dynamic load library and/or other sequence of instructions designed for execution on a computer system.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The corresponding structures, materials, acts, and equivalents of all means or step plus function elements that may be found in the claims below are intended to include any structure, material, or act for performing the function in combination with other claimed elements as specifically claimed.

The inventive arrangements described herein may be implemented as a method or process performed by a data processing system. In another aspect, the inventive arrangements may be implemented as an apparatus such as a data processing system having a processor. The processor, upon executing program code, may perform one or more operations described herein. In one aspect, the apparatus may be a client-side device. In another aspect, the apparatus may be a server-side device. Exemplary devices may include, but are not limited to, a communication device whether mobile or not, an appliance, a network communication node, computing system, or the like. In still another aspect, the inventive arrangements may be implemented as a non-transitory computer-readable storage medium storing program code that, when executed, causes a processor and/or a system to perform and/or initiate a method or process.

A method of managing a plurality of images may include generating, using a processor, clusters of images from a plurality of images having locations and timestamps, wherein the clusters represent events and are generated according to a distance metric based upon geographic distance and time difference between consecutive pairs of the plurality of images sorted according to time. The method may include merging, using the processor, selected clusters into a merged cluster representing a trip based upon geographic distance between the clusters and unique dates within the clusters. The method may also include displaying, using the processor, the plurality of images organized according to the trip.

The method may include selectively including an additional image without a location into the trip according to a timestamp of the additional image.

The method may include clustering a further plurality of images with timestamps and without locations into additional trips according to time.

Generating clusters of images from the plurality of images having locations and timestamps may include sorting the plurality of images according to timestamps, determining the distance metric for consecutive pairs of the sorted plurality of images, and iteratively clustering the sorted plurality of images according to the distance metrics and number of images.

Merging selected clusters into the merged cluster representing a trip may include grouping the clusters into cluster groups according to geographic distance between clusters, selecting a cluster group according to unique dates in the cluster groups, sorting the clusters of the selected cluster group according to timestamps, and selectively combining at least two clusters of the cluster group into the merged cluster according to a time difference and geographic distance between the at least two clusters.

Selecting a cluster group according to unique dates in the cluster groups may include, for each cluster group, determining a ratio of unique dates in the cluster group to total unique dates across the plurality of clusters. The method may also include selecting the cluster group having a ratio not exceeding a trip threshold.

A system for managing images may include a processor programmed to initiate executable operations. The executable operations may include generating clusters of images from a plurality of images having locations and timestamps, wherein the clusters represent events and are generated according to a distance metric based upon geographic distance and time difference between consecutive pairs of the plurality of images sorted according to time. The executable operations may include merging selected clusters into a merged cluster representing a trip based upon geographic distance between the clusters and unique dates within the clusters. The executable operations may also include displaying the plurality of images organized according to the trip.

The processor may be further programmed to initiate executable operations including selectively including an additional image without a location into the trip according to a timestamp of the additional image.

The processor may be further programmed to initiate executable operations including clustering a further plurality of images with timestamps and without locations into additional trips according to time.

Generating clusters of images from the plurality of images having locations and timestamps may include sorting the plurality of images according to timestamps, determining the distance metric for consecutive pairs of the sorted plurality of images, and iteratively clustering the sorted plurality of images according to the distance metrics and number of images.

Merging selected clusters into the merged cluster representing a trip may include grouping the clusters into cluster groups according to geographic distance between clusters, selecting a cluster group according to unique dates in the cluster groups, sorting the clusters of the selected cluster group according to timestamps, and selectively combining at least two clusters of the cluster group into the merged cluster according to a time difference and geographic distance between the at least two clusters.

Selecting a cluster group according to unique dates in the cluster groups may include, for each cluster group, determining a ratio of unique dates in the cluster group to total unique dates across the plurality of clusters.

The processor may be further programmed to initiate executable operations including selecting the cluster group having a ratio not exceeding a trip threshold.

A computer program product includes a computer readable storage medium having program code stored thereon. The program code is executable by a processor to perform a method of managing images. The method may include generating, using the processor, clusters of images from a plurality of images having locations and timestamps, wherein the clusters represent events and are generated according to a distance metric based upon geographic distance and time difference between consecutive pairs of the plurality of images sorted according to time. The method may include merging, using the processor, selected clusters into a merged cluster representing a trip based upon geographic distance between the clusters and unique dates within the clusters. The method may also include displaying, using the processor, the plurality of images organized according to the trip.

The method may include selectively including an additional image without a location into the trip according to a timestamp of the additional image.

The method may include clustering a further plurality of images with timestamps and without locations into additional trips according to time.

Generating clusters of images from the plurality of images having locations and timestamps may include sorting the plurality of images according to timestamps, determining the distance metric for consecutive pairs of the sorted plurality of images, and iteratively clustering the sorted plurality of images according to the distance metrics and number of images.

Merging selected clusters into the merged cluster representing a trip may include grouping the clusters into cluster groups according to geographic distance between clusters, selecting a cluster group according to unique dates in the cluster groups, sorting the clusters of the selected cluster group according to timestamps, and selectively combining at least two clusters of the cluster group into the merged cluster according to a time difference and geographic distance between the at least two clusters.

Selecting a cluster group according to unique dates in the cluster groups may include, for each cluster group, determining a ratio of unique dates in the cluster group to total unique dates across the plurality of clusters. The method may also include selecting the cluster group having a ratio not exceeding a trip threshold.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of managing a plurality of images, comprising:
    generating, using a processor, clusters of images from a plurality of images having locations and timestamps, wherein the clusters represent events and are generated according to a distance metric based upon geographic distance and time difference between consecutive pairs of the plurality of images sorted according to time;
    merging, using the processor, selected clusters into a merged cluster representing a trip by grouping the clusters into cluster groups according to geographic distance between the clusters, selecting a cluster group according to unique dates in the cluster groups, sorting the clusters of the selected cluster group according to timestamps, and combining at least two of the clusters of the selected cluster group into the merged cluster according to a time difference and the geographic distance between the at least two clusters; and
    displaying, using the processor, the plurality of images organized according to the trip.

2. The method of claim 1, further comprising:
    including an additional image without a location into the trip in response to determining that a timestamp of the additional image is between an earliest timestamp for an image in the trip and a latest timestamp of an image in the trip.

3. The method of claim 1, wherein the generating the clusters of images from the plurality of images having locations and timestamps comprises:
    sorting the plurality of images according to timestamps;
    determining the distance metric for consecutive pairs of the sorted plurality of images; and
    iteratively clustering the sorted plurality of images according to the distance metrics and number of images.

4. The method of claim 1, wherein the selecting the cluster group according to the unique dates in the cluster groups comprises:
    for each cluster group, determining a ratio of the unique dates in the cluster group to total unique dates across the clusters of the cluster groups.

5. The method of claim 4, further comprising:
    selecting the cluster group having a ratio not exceeding a trip threshold.

6. A system for managing images, comprising:
    a processor programmed to initiate executable operations comprising:
    generating clusters of images from a plurality of images having locations and timestamps, wherein the clusters represent events and are generated according to a distance metric based upon geographic distance and time difference between consecutive pairs of the plurality of images sorted according to time;
    merging selected clusters into a merged cluster representing a trip by grouping the clusters into cluster groups according to geographic distance between the clusters, selecting a cluster group according to unique dates in the cluster groups, sorting the clusters of the selected cluster group according to timestamps, and combining at least two of the clusters of the selected cluster group into the merged cluster according to a time difference and the geographic distance between the at least two clusters; and
    displaying the plurality of images organized according to the trip.

7. The system of claim 6, wherein the processor is further programmed to initiate executable operations comprising:
    including an additional image without a location into the trip in response to determining that a timestamp of the additional image is between an earliest timestamp for an image in the trip and a latest timestamp of an image in the trip.

8. The system of claim 6, wherein the generating the clusters of images from the plurality of images having locations and timestamps comprises:
    sorting the plurality of images according to timestamps;
    determining the distance metric for consecutive pairs of the sorted plurality of images; and
    iteratively clustering the sorted plurality of images according to the distance metrics and number of images.

9. The system of claim 6, wherein the selecting the cluster group according to the unique dates in the cluster groups comprises:
    for each cluster group, determining a ratio of the unique dates in the cluster group to total unique dates across the clusters of the cluster groups.

10. The system of claim 9, wherein the processor is further programmed to initiate executable operations comprising:
    selecting the cluster group having a ratio not exceeding a trip threshold.

11. A computer program product comprising a computer readable storage medium having program code stored thereon, the program code executable by a processor to perform a method of managing images, comprising:
- generating, using the processor, clusters of images from a plurality of images having locations and timestamps, wherein the clusters represent events and are generated according to a distance metric based upon geographic distance and time difference between consecutive pairs of the plurality of images sorted according to time;
- merging, using the processor, selected clusters into a merged cluster representing a trip by grouping the clusters into cluster groups according to geographic distance between the clusters, selecting a cluster group according to unique dates in the cluster groups, sorting the clusters of the selected cluster group according to timestamps, and combining at least two of the clusters of the selected cluster group into the merged cluster according to a time difference and the geographic distance between the at least two clusters; and
- displaying, using the processor, the plurality of images organized according to the trip.

12. The computer program product of claim 11, wherein the method further comprises:
including an additional image without a location into the trip in response to determining that a timestamp of the additional image is between an earliest timestamp for an image in the trip and a latest timestamp of an image in the trip.

13. The computer program product of claim 11, wherein the generating the clusters of images from the plurality of images having locations and timestamps comprises:
- sorting the plurality of images according to timestamps;
- determining the distance metric for consecutive pairs of the sorted plurality of images; and
- iteratively clustering the sorted plurality of images according to the distance metrics and number of images.

14. The computer program product of claim 11, wherein the selecting the cluster group according to the unique dates in the cluster groups comprises:
- for each cluster group, determining a ratio of the unique dates in the cluster group to total unique dates across the clusters of the cluster groups; and
- selecting the cluster group having a ratio not exceeding a trip threshold.

* * * * *